C. Stowe.
Grain Band.
Nº 28019. Patented Apr. 24, 1860.
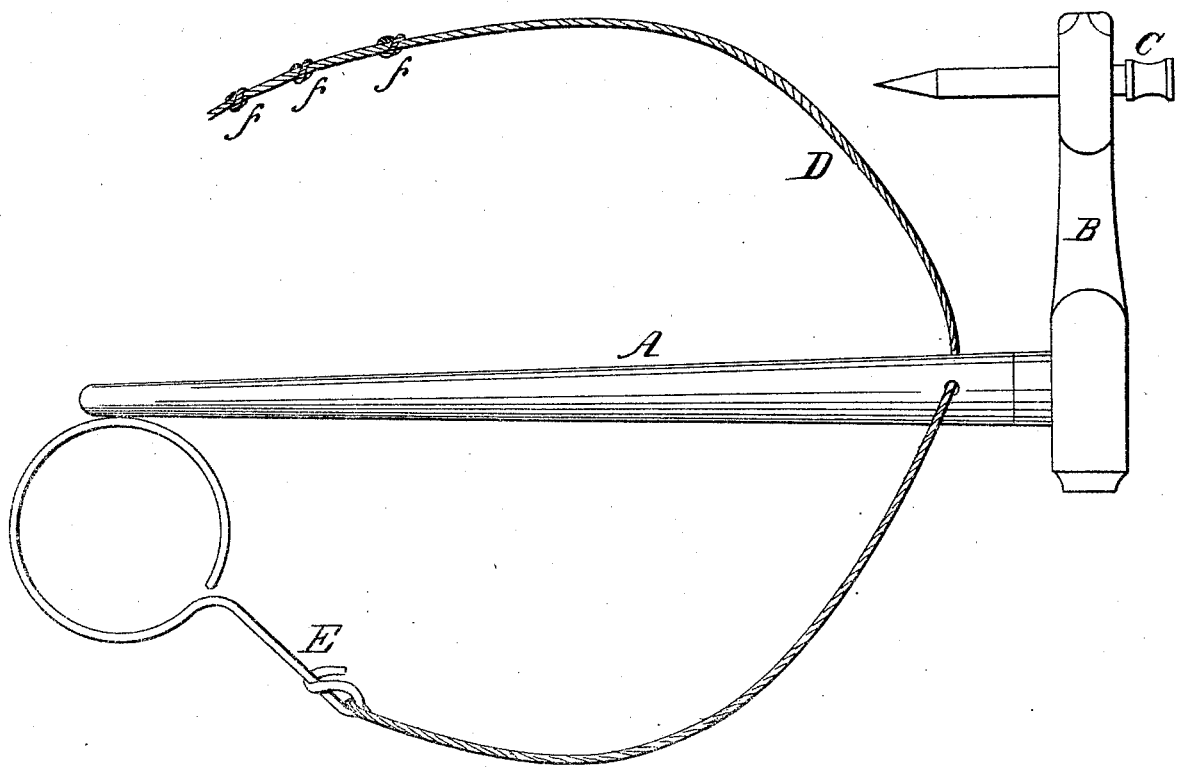

UNITED STATES PATENT OFFICE.

CALVIN STOWE, OF BRACEVILLE, OHIO.

IMPROVEMENT IN CORN-SHOCK BINDERS.

Specification forming part of Letters Patent No. 28,019, dated April 24, 1860.

*To all whom it may concern:*

Be it known that I, CALVIN STOWE, of Braceville, in the county of Trumbull and State of Ohio, have invented a new and useful Improvement in the Construction of Corn-Shock Binders; and I do hereby declare that the following is a full, clear, and exact description of the construction and operation of the same, reference being had to the annexed drawing, making a part of this specification, in which—

A represents the spindle or shaft; B, the crank; C, the sliding handle; D, the rope; E, the hook; $fff$, knots in the rope.

The operation is as follows: A shock of corn is set up in the usual way, the spindle is thrust into it with the crank downward, the rope is put around the shock, the hook drawn over one of the knots. The crank is then turned, and when sufficiently tight the sliding handle is slipped into the shock, so as to catch and hold the crank from turning back while the band is put on. The handle is then pulled back, the rope loosened, and the work is done.

I do not claim as my invention the binding of corn-shocks with spindle, crank, and rope. That is not new; but

What I claim as my invention and improvement, and wish to secure by Letters Patent, is—

The sliding handle C, hook E, and knots $f$ $ff$, as described, for the purpose specified.

CALVIN STOWE.

Witnesses:
 HENRY STOWE,
 GEORGE STOWE.